United States Patent [19]

Faulstich

[11] 4,103,956
[45] Aug. 1, 1978

[54] PICKUP TRUCK BOX ENCLOSURE

[76] Inventor: Eugene W. Faulstich, 1415 18th Ave. West, Spencer, Iowa 51301

[21] Appl. No.: 743,229

[22] Filed: Nov. 19, 1976

[51] Int. Cl.² .............................................. B60D 15/50
[52] U.S. Cl. ....................................... 296/10; 49/193; 296/24 R
[58] Field of Search ..................... 296/28 R, 28 M, 10, 296/24 R, 24 B, 37.6, 37.16, 37.1, 51, 52, 56, 57 R; 312/233, 138 R; 49/382, 193, 261

[56] References Cited

U.S. PATENT DOCUMENTS

| Re. 27,034 | 1/1971 | Bezlaj | 296/24 R |
|---|---|---|---|
| 2,201,370 | 5/1940 | Julien | 49/261 X |
| 3,027,188 | 3/1962 | Eichstadt | 296/51 |
| 3,376,688 | 4/1968 | Smedstadt | 296/10 |

FOREIGN PATENT DOCUMENTS

| 467,429 | 6/1914 | France | 296/24 R |
|---|---|---|---|
| 829,971 | 7/1938 | France | 296/24 R |
| 1,370,079 | 7/1964 | France | 296/24 R |

*Primary Examiner*—John A. Pekar
*Attorney, Agent, or Firm*—Zarley, McKee, Thomte, Voorhees & Sease

[57] ABSTRACT

An enclosure is provided over the bed of a pickup truck and includes a support wall along each side in which four tote trays are accessible and removable through doors in the opposite sidewalls of the enclosure. A divider wall extends between the enclosure sidewalls to define front and rear storage areas with the front storage area having top and bottom sections separated by the support wall which extends between the opposite sidewalls of the enclosure. The top section of the front storage area is accessible from the inside of the cab. The rear wall of the enclosure includes a door which is removable, pivotal upwardly or pivotal downwardly to provide a worktable surface. The pivoting action is provided by top and bottom retractable outwardly extending actuating pins received in slots at the top and holes at the bottom in brackets mounted at the sides of the door opening. Upon the door being pivoted upwardly and pushed inwardly to the end of the slots the upper end of the door engages stops which hold the door in a raised horizontal position. Two separate controls for the two pairs of actuating pins are provided and each involves a rotatable member connected to the actuating pins on opposite sides of the axis of rotation such that rotation of the control member causes the actuating pins to be moved together inwardly or outwardly.

12 Claims, 7 Drawing Figures

U.S. Patent  Aug. 1, 1978  4,103,956
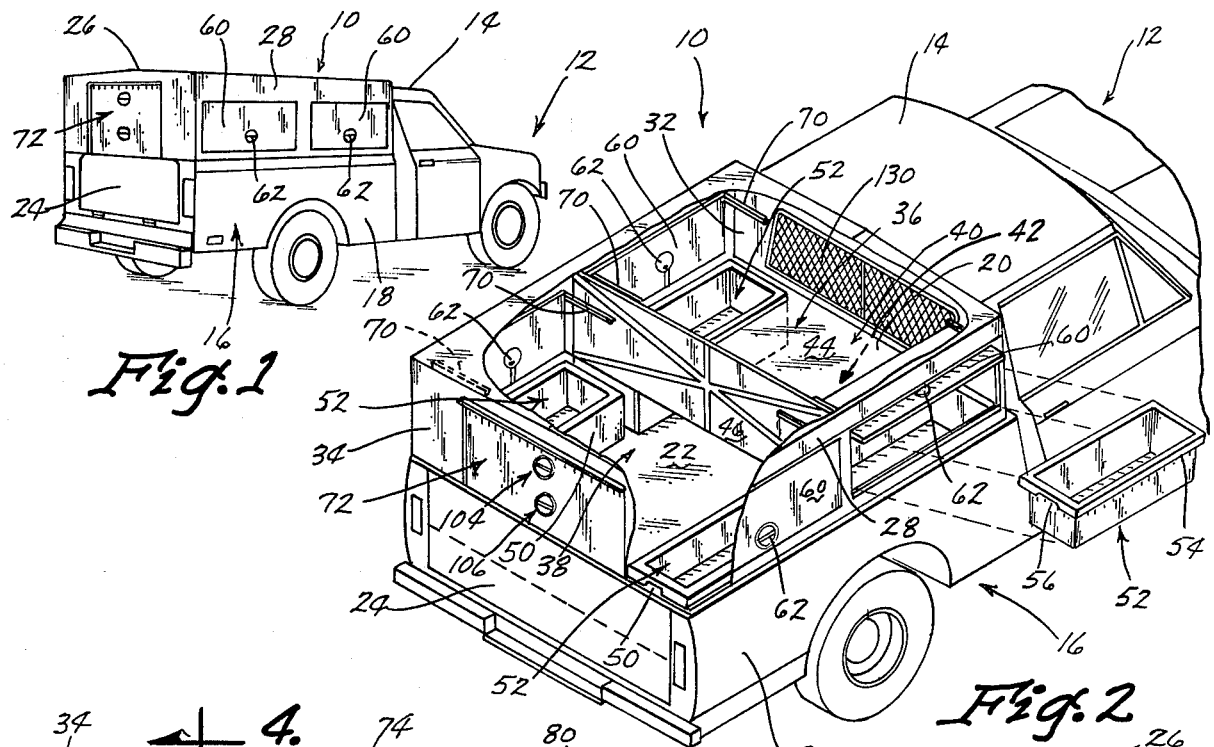
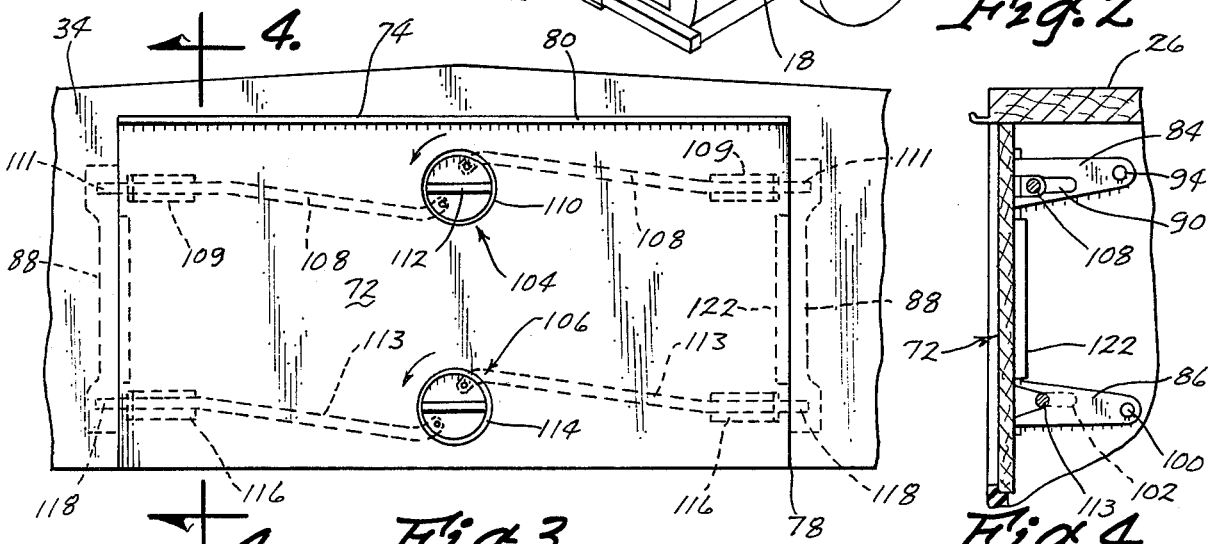
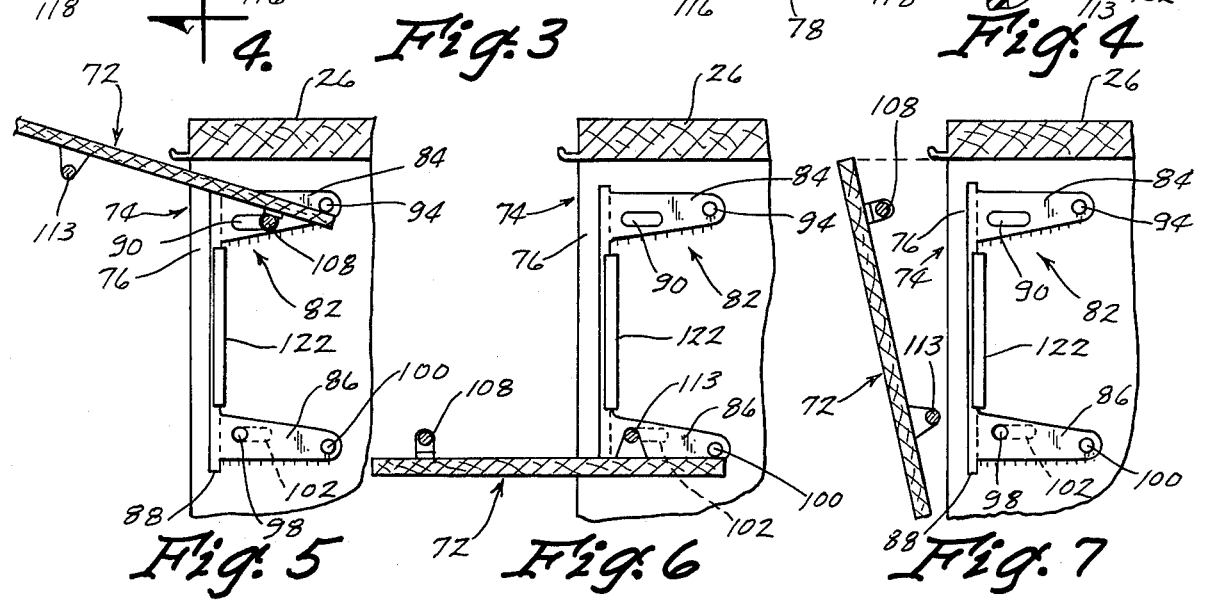

PICKUP TRUCK BOX ENCLOSURE

BACKGROUND OF THE INVENTION

The cargo area in a pickup truck is limited and thus needs to be well organized and accessible by workmen from the inside of the truck cab as well as from all sides on the outside. The cargo area needs to be protected by an enclosure which is durable and attractive in appearance and easily manufactured at a reasonable cost.

SUMMARY OF THE INVENTION

The pickup box enclosure of this invention is modular in design and fabricated from fiberglass. Front and rear storage areas are provided on opposite sides of a divider wall which extends from the top of the enclosure to the top plane of the box sidewalls. A support wall in the front storage area divides it into top and bottom sections with the bottom section being open from the front of the box to the tail gate and the rear storage area being open from the top of the enclosure to the box bed or floor.

Tote trays are positioned in openings in the support wall along each side of the box sidewalls and are accessible through doors in the enclosure sidewalls whereby the tote trays may be lifted in and out of the box. The cab of the truck has access to the top section of the front storage area through a window in the back wall of the cab and through the front wall of the enclosure.

A door or tail gate is provided in the back wall of the enclosure which is removable or pivotable upwardly or downwardly and in the downward position serves as a worktable. Two pairs of top and bottom oppositely disposed actuating pins on the door are retractable and serve as pivots for the opening and closing of the door. The top pins are movable in slots in side brackets which allow the door to be pushed inwardly when in the raised position to engage a stop to maintain the door in a raised horizontal position.

Thus it is seen that the tote trays may be removed at the end of each working day thereby making replenishing of supplies a simple matter. All materials are kept in a warm, dry and clean storage area within the box of the truck which is totally enclosed but yet accessible from all sides of the truck on the outside and from the inside of the cab. Access from the inside of the cab makes it convenient to store things in the truck box that normally would have to be kept in the cab such as test equipment, wearing apparel and other items. It is not necessary to go outside in inclement weather to obtain items from the truck box when access can be had to the interior of the truck box directly from the vehicle cab.

Great versatility is provided in the box enclosure tail gate which can be either pivoted upwardly or downwardly or removed and when pivoted downwardly it functions as a worktable.

DESCRIPTION OF THE DRAWINGS

FIG. 1 is a perspective view of the pickup truck box enclosure mounted on a pickup truck.

FIG. 2 is a fragmentary enlarged exploded perspective view of the box enclosure mounted on a pickup truck with the interior of the enclosure being shown.

FIG. 3 is a fragmentary enlarged end elevation view of the enclosure tail gate.

FIG. 4 is a cross sectional view taken along line 4-4 in FIG. 3 showing the enclosure tail gate in its closed position.

FIG. 5 is a view similar to FIG. 4 but showing the enclosure tail gate in its raised position.

FIG. 6 is a view similar to FIG. 4 but showing the enclosure tail gate in its lowered worktable position.

FIG. 7 is a view similar to FIG. 4 but showing the enclosure tail gate being removed.

DESCRIPTION OF THE PREFERRED EMBODIMENT

The pickup box enclosure of this invention is referred to generally in FIG. 1 by the reference numeral 10 and is shown on a pickup truck 12 having a cab 14 and box 16. The box has opposite sidewalls 18, a front wall 20, a bed or floor 22, and a tail gate 24.

The box enclosure 10 includes a top wall 26, opposite sidewalls 28 and 30, a front wall 32 and a rear wall 34.

The interior of the storage area created by the enclosure 10 over the truck box 16 is divided into front and rear storage areas 36 and 38 with the front storage area being further divided into top and bottom sections 40 and 42 separated by a support wall 44 which extends between the opposite sidewalls 28 and 30 of the enclosure at the intersection of the enclosure and box. A divider 46 separates the front and rear storage areas 36 and 38 and extends from the top wall 26 of the enclosure to the top of the box 16. The bottom section 42 of the front storage area 36 is open to the rear storage area 38 and thus provides storage area for long objects under the support wall 44. Access to the bed 22 of the truck box 16 for long objects is through the tail gate 24 which may be pivoted to its open position in a conventional manner.

The support wall 44 is integral with the enclosure body 10 and includes portions 50 along opposite sides in the rear storage area 38 whereby tote trays 52 are provided on each side of both front and rear storage areas 36 and 38 and are supported by flanges 54 extending around the periphery of the trays 52 which engage the top surface of the support wall 44 and support portions 50. Handle gripping means 56 are provided at each end of the trays 52 for lifting them out of the wells formed in the support wall 44 and support portions 50.

Access to the trays 52 is provided by a separate door 60 in the sidewalls of the enclosure 10 wherein each door is locked closed by a latch 62 operable from the outside. The door 60 in its raised opened position slides inwardly horizontally on tracks 70 on the front wall 32, center divider 46 and rear wall 34. Thus it is seen that two trays 52 are provided in each of the front and rear storage areas 36 and 38, respectively.

The rear wall 34 of the enclosure 10 includes its own tail gate 72 above the pickup truck box tail gate 24. A tail gate 72 is illustrated in detail in FIGS. 3-7. The tail gate 72 functions as a door to close an opening 74 having opposite side edges 76 and 78 and a top edge 80. Each of these side edges, 76 and 78, include hinge brackets 82 which include like top and bottom legs 84 and 86 connected to a mounting flange 88 in turn connected to the opposite opening edges 76 and 78. The top leg 84 includes an elongated slot 90 spaced from a stop pin 94. The bottom leg 86 need only have a hole 98 and a stop pin 100 although a slot 102 shown in dashlines similar to the slot 90 may be provided.

The door 72 includes top and bottom actuating pin assemblies 104 and 106 with the top assembly having oppositely extending pins 108 extending through guides 109 adjacent the side edges of the door with the outer end portions 111 of the pins being received in the slots 90 in the upper legs 84 of the brackets 82. The inner ends of the pins 108 are connected to opposite sides of the axis of rotation of a control member 110 having a handle portion 112 whereby rotation in either direction moves the pins 108 in unison either outwardly or inwardly.

The bottom actuating pin assembly 106 is identical to the top assembly 104 and includes pins 113 connected to a control member 114 at their inner ends and have their outer ends extending through guides 116 with their outer end portions 118 received in the holes 98 or slots 102 in the lower legs 86 of the brackets 82.

Vertically disposed stops 122 are provided on the opposite side edges 76 and 78 for the door 72 to abut against to limit inward movement of the door, as seen in FIG. 4.

The front wall 32 of the enclosure includes an opening in alignment with the opening in the rear wall of the cab and these openings may be continuously open or temporarily closed by a window or screen 130, as seen in FIG. 2. In any event, easy access is contemplated to the upper section 40 of the forward storage area 36 from the inside of the cab 14.

In operation it is seen that the trays 52 will be filled with appropriate materials and placed through the openings in the sidewalls 28 and 30 by opening the door 60, as seen in FIG. 2, thereby providing access to the wells in the support floor 44 and support portions 50. It is noted that access from the cab is possible to the front two trays 52 as are other materials stored in the top storage section 40.

During loading and working operations the enclosure tail gate or door 72 may be totally removed by retracting all actuating pins 108 and 113 or pivoted to an up position, as seen in FIG. 5, by retracting only the bottom pins 113; or pivoted to a down position, as seen in FIG. 6, by retracting only the upper actuating pins 108. The door is locked in its up position by being pushed forwardly the length of the slot 90 until the top edge passes under the stop pins 94 while the door, when pivoted downwardly is limited against further pivoting by the stop pins 100.

I claim:

1. A door assembly for use with an enclosure comprising,
a vertical wall having an opening defined by top and bottom and opposite sidewall portions,
a door adpated to be positioned in said opening and having top and bottom and opposite side edges,
oppositely disposed horizontally outwardly extending retractable actuating pins on said door adjacent its top edge,
the opposite sidewall portions operatively including horizontally extending slots having innner and outer ends, said slots positioned adjacent said top portion so as to receive said actuating pins when the door is positioned in said opening,
said oppositely disposed pins insertable into the slots in said opposite sidewall portions to support said door,
said door being pivotable about the longitudinal axis of said pins when said pins are positioned in the outer ends of said slots between a vertically closed position and a horizontally raised position,
stop elements on said sidewall portions adjacent the inner ends of said slots, said stop elements positioned so as to engage an upper end of said door, when said door is in the horizontally raised position therefor and moved inwardly to position the pins at the inner ends of said slots, to limit downward pivoting of said door to said closed position, and
control means on said door connected to said actuation pins for retracting said pins from said slots to allow said door to be removed from said opening.

2. The structure of claim 1 wherein said door includes oppositely disposed horizontally extending retractable actuating pins adjacent the bottom edge thereof engageable in holes operatively provided in said opposite sidewall portions below said slots whereby said door may be pivoted from a closed vertical position downwardly to a lowered horizontal position and a second control means is provided on said door connected to said second mentioned pins for retracting said second mentioned pins from said holes thereby allowing said door to be removed from said opening.

3. The structure of claim 2 wherein oppositely disposed stops are provided on said sidewall portions adjacent said holes for engagement by the bottom edge of said door when pivoted to an open horizontal position to thereby provide a table surface.

4. The structure of claim 3 wherein stops are provided on said sidewall portions and extend into said opening to limit movement of said door when in a closed position, inwardly towards the inner ends of said slots.

5. The structure of claim 4 wherein said last mentioned stops are positioned on said opposite sidewall portions between said slots and holes whereby the top and bottom edges of said door may extend into said opening when said door is in either its raised or lowered horizontal positions without engagement with said last mentioned stops.

6. The structure of claim 2 wherein said first and second control means are further defined by each being a rotatable member having said associated actuating rods connected thereto on opposite sides of the axis of rotation whereby rotation of said member simultaneously extends or retracts said rods.

7. The structure of claim 1 wherein said control means is further defined as a rotatable member having said associated actuating rods connected thereto on opposite sides of the axis of rotation whereby rotation of said member simultaneously extends or retracts said rods.

8. In a pickup truck having a cab and a box including opposite sidewalls, front wall, and rear tailgate, the improvement comprising,
a box enclosure on said box including a top wall, and front and rear end walls and opposite sidewalls operatively associated with the front wall, rear tailgate and opposite sidewalls respectively of the box so as to form an upper vertical extension thereof,
a support wall situated along one sidewall of said box in a horizontal plane extending substantially through the intersection of said box enclosure and box and said support wall having an opening,
a storage tray,
coacting means on said storage tray and support wall for positioning the storage tray in nesting relation in said opening substantially below said support wall, said support tray having handle means above said support wall for handling said tray,
the enclosure sidewall above said one sidewall of said box having an access opening for access to said storage tray and large enough to allow removal of said tray through said access opening, and a door positioned in said enclosure sidewall access opening.

9. The structure of claim 8 wherein said support wall extends between opposite sidewalls of said box directly behind said cab and access openings are provided in said cab and in said front wall of the box enclosure at positions in at least partial alignment for access to said support wall from said cab.

10. The structure of claim 9 wherein a second opening is provided in said support wall and said second opening is along the opposite sidewall of said box and a tray is positioned in said opening, an access opening and door are provided in the enclosure side wall above and adjacent said second opening in said support wall.

11. The structure of claim 10 wherein said support wall includes opposite front and rear ends situated toward and away from the cab respectively, and a vertically disposed divider wall extends between said enclosure opposite sidewalls at the rear end of said support wall, and a storage chamber is provided between said support wall and a bottom wall in said box.

12. In a pickup truck having a cab, and a box including opposite sidewalls, front wall, and rear tailgate, the improvement comprising, a box enclosure on said box including a top wall, and front and rear end walls and opposite sidewalls operatively associated with the front wall, rear tailgate and opposite sidewalls, respectively of the box so as to form an upper vertical extension thereof, a support wall situated along one sidewall of said box in a horizontal plane extending substantially through the intersection of said box enclosure and box and said support wall having an opening, a storage tray, coacting means on said storage tray and support wall for positioning the storage tray in nesting relation in said opening substantially below said support wall, said support tray having handle means above said support wall for handling said tray, the enclosure sidewall above said one sidewall of said box having an access opening for access to said storage tray and large enough to allow removal of said tray through said access opening, a door positioned in said enclosure sidewall access opening, said rear wall of said enclosure having an opening defined by top and bottom, and opposite sidewall portions, a door adapted to be positioned in said opening and having top and bottom and opposite side edges, oppositely disposed horizontally outwardly extending retractable actuating pins on said door adjacent its top edge, the opposite side wall portions operatively including horizontally extending slots having inner and outer ends, and stop elements are positioned on said sidewall portions adjacent the inner ends of said slots, said oppositely disposed pins insertable into the slots in said opposite sidewall portions to support said door, said door being pivotable about the longitudinal axis of said pins when said pins are positioned in the outer ends of said slots between a vertically closed position and a horizontally raised position and said upper end of said door being adapted to engage said stops when said pins are in the inner ends of said slots to limit downward pivoting of said door to a closed position, and control means on said door connected to said actuation pins for retracting said pins from said slots to allow said door to be removed from said opening.

* * * * *